(12) United States Patent
Morris et al.

(10) Patent No.: US 7,111,933 B2
(45) Date of Patent: Sep. 26, 2006

(54) INK-JET SYSTEMS AND METHODS USING VISIBLE AND INVISIBLE INK

(75) Inventors: Peter C. Morris, San Diego, CA (US); John L. Stoffel, San Diego, CA (US); Glen Hopkins, San Diego, CA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 252 days.

(21) Appl. No.: 10/696,161

(22) Filed: Oct. 29, 2003

(65) Prior Publication Data

US 2005/0093948 A1    May 5, 2005

(51) Int. Cl.
*B41J 2/17* (2006.01)

(52) U.S. Cl. .......................... 347/98; 347/96; 347/100

(58) Field of Classification Search ................ 347/100, 347/101, 96, 95, 98, 105; 106/31.13, 31.27, 106/31.6; 523/160
See application file for complete search history.

(56) References Cited

U.S. PATENT DOCUMENTS

| | | | |
|---|---|---|---|
| 3,454,344 A | | 7/1969 | Ryan et al. |
| 4,198,445 A | * | 4/1980 | Sokol et al. ................ 427/140 |
| 5,286,061 A | * | 2/1994 | Behm. .......................... 283/95 |
| 5,395,432 A | * | 3/1995 | Nelson et al. ................ 347/98 |
| 5,476,830 A | | 12/1995 | Gundjian |
| 5,935,308 A | | 8/1999 | Siddiqui et al. |
| 6,084,621 A | | 7/2000 | Shioya |
| 6,124,377 A | | 9/2000 | Kaiser et al. |
| 6,316,081 B1 | | 11/2001 | Nelson et al. |
| 6,431,448 B1 | | 8/2002 | Nelson et al. |
| 6,499,840 B1 | | 12/2002 | Day et al. |
| 6,515,717 B1 | | 2/2003 | Jiang et al. |
| 6,541,100 B1 | | 4/2003 | Williams et al. |

FOREIGN PATENT DOCUMENTS

| | | |
|---|---|---|
| EP | 0 314 597 | 5/1989 |
| GB | 2 316 682 | 3/1998 |

OTHER PUBLICATIONS

R.R. Bell et al, "Character Highlighting with All-Points-Addressable Printers", Technical Disclosure Bulletin, V. 24(1B), Jun. 1981.
T.G. Davies et al, "Character Highlighting Technique", Technical Disclosure Bulletin, V.18(10), Mar. 1976.

* cited by examiner

*Primary Examiner*—Manish S. Shah

(57) ABSTRACT

Ink-jet printing systems and methods of use for printing visible and invisible inks for subsequent development, which can produce text with associated highlighting or underlining that reduces messiness inherent in highlighting important text are disclosed. The ink-jet printing systems and methods of use can include a substrate, visible ink-jet ink configured to be ink-jetted onto at least a portion of the substrate to form a first visible image, a first invisible composition configured to be ink-jetted onto at least a portion of the substrate to form an invisible image visibly associated with the first visible image, and a second invisible composition configured for over-striking at least a portion of the invisible image. The first and second invisible compositions can be further configured to react and form a second visible image on the substrate.

22 Claims, No Drawings

INK-JET SYSTEMS AND METHODS USING VISIBLE AND INVISIBLE INK

FIELD OF THE INVENTION

The present invention relates to ink-jet systems and methods of use. More particularly, the present invention involves visible and invisible ink.

BACKGROUND OF THE INVENTION

Invisible inks have been known for quite some time. In the past, invisible ink has typically been used to write secret messages and/or codes, and configured to become visible upon treatment with heat and/or chemicals. Invisible inks are often still used as novelty items, children's toys, and for encoded data, where the invisible ink can be developed to become visible by employing appropriate chemistry.

People often use highlighting or underlining markers to write memory-jogging messages, highlights, and/or underlines correlated with written text. Existing highlighting practices often use markers that contain visible colorants, which can be fluorescent to draw attention to specific segments of important text. However, the color imparted by these highlighting markers can have an inherent messiness if not used with precision and care because of the difficulty of sketching freehand straight lines or the like. Also, messages, highlights, and/or underlines written with these markers typically cannot be reversed if needed or desired. Further, both the chemical and physical components of many existing highlighting markers can damage printed text and/or paper.

Recently, these problems have become exacerbated because of the use of personal computers and ink-jet printers for printing text. People often download information or input information into their personal computers for the purpose of printing readable text onto paper, where the paper containing the text is portable, highlightable, and can be easier to read. Ink-jet printing has become a popular way of recording text because of the low printer noise, the capability of high-speed recording, and multi-color recording at a relatively low price to consumers. Unfortunately, when an individual wants to highlight an inkjet printed passage of text using conventional highlighting markers, the highlighting can be irreversible, messy, and can smear the printed text. Thus, there is a need for providing an ink-jet system and method of use that would allow for an individual to print a passage of text and highlight the text, where the highlighting can be precise, reversible, and/or does not damage the printed text.

SUMMARY OF THE INVENTION

It has been recognized that it would be advantageous to develop ink-jet systems and methods for printing visible characters and invisible markings that could become visible upon application of appropriate chemistry. In accordance with this, an ink-jet printing system can include a substrate, visible ink, and first and second invisible compositions. The visible ink can be configured to be ink-jetted onto the substrate, which can then form a first visible image. Also, the first invisible composition can be configured to be ink-jetted onto the substrate, which can then form an invisible image that is associated with the first visible image. In addition, the second invisible composition can be configured for over-striking the invisible image, which can then cause a reaction between the first and second compositions. The reaction can result in forming a second visible image, which visibly associates the first visible image with the second visible image.

In another embodiment, a method of ink-jet printing is provided that can include ink-jetting a visible ink to form a first visible image on a substrate, and ink-jetting a first invisible composition to form an invisible image associated with the first visible image. Also, a second invisible composition can be used for over-striking the invisible image, which can cause a reaction between the first and second invisible compositions. The reaction can form a second visible image on the substrate associated with the first visible image.

In yet another embodiment, an ink-jet printing system can include a substrate, visible ink, and first and second invisible compositions. The visible ink can be configured to be ink-jetted onto the substrate to form a first visible image. In one embodiment, the first visible image can be a character. The first invisible composition can likewise be configured to be ink-jetted onto the substrate to form an invisible image, wherein the invisible image can be visibly associated with the first visible image. In addition, the second invisible composition can be configured for over-striking the invisible image, wherein either the first or the second invisible composition is an invisible ink, and the other is a developer. Additionally, the developer can be configured for developing the invisible ink to form a second visible image, which can be a highlight and/or underline.

Additional features and advantages of the invention will be apparent from the detailed description that follows, which illustrates, by way of example, features of the invention.

DETAILED DESCRIPTION OF THE INVENTION

Before embodiments of the present invention are disclosed and described, it is to be understood that the invention is not limited to these particular compositions, systems, methods and materials, which are disclosed herein because such may vary. It should also be understood that all terminology used herein is only for the purpose of describing particular embodiments of the invention. These terms are not intended to be limiting in any way, and should not be misconstrued to limit the scope of the present invention.

It must be noted that, as used in this specification and the appended claims, the singular forms "a," "an," and "the" include plural referents unless the context clearly dictates otherwise.

The term "substantially" when used with another term shall include from mostly to completely.

As used herein, "effective amount" refers to at least the minimal amount of a substance or agent, which is sufficient to achieve a desire effect. For example, an effective amount of a "liquid vehicle" is at least the minimum amount required in order to create an ink composition, while maintaining properties necessary for effective ink-jetting or over-striking.

As used herein, "liquid vehicle" refers to the fluid in which developer, colorant, and/or pre-colorant is solvated or dispersed to form ink-jet inks, ink-jettable liquid compositions, and/or over-striking compositions that can be used in accordance with the present invention. Many liquid vehicles and vehicle components are well known in the art. Liquid vehicles that are used for generating ink-jettable compositions can be different in composition than liquid vehicles used to form compositions that are applied by means other than by inkjet architecture, such as by a marker or pen.

However, this is not always the case. Typically, liquid vehicles can include any mixture of a variety of different agents, such as co-solvents, surfactants, buffers, biocides, sequestering agents, viscosity modifiers, anti-oxidants, flame retardants, water, etc.

The term "colorant" can include dyes and/or pigments that may be used to impart color to a composition and/or image in accordance with embodiments of the present invention. In accordance with the present invention, a colorant is typically used in ink-jet inks that are visible and can form visible images upon application to a substrate. Thus, a composition containing an effective amount of colorant can be substantially visible.

In the alternative, a "pre-colorant" can include developable colorants that are substantially colorless. In accordance with the present invention, an effective amount of pre-colorant can be present with a liquid vehicle to form a substantially invisible or colorless ink. Such a colorless ink can be configured to be applied using ink-jet architecture, or alternatively, using a marker (or other similar instrument). Such inks can be configured to provide color upon interaction with a developer.

As used herein, "invisible ink" refers to an ink composition including a pre-colorant and a liquid vehicle. The pre-colorant in the invisible ink can be developed through a reaction with a developer, thereby causing the pre-colorant to become visible. An invisible ink can be configured to be ink-jettable or be deposited with a marker, pen, or the like.

As used herein, "developer" refers to a composition that is substantially invisible or colorless, and includes at least one active ingredient that is reactive with a pre-colorant of an invisible ink, wherein upon reaction, the invisible ink becomes a visible color. A developer can be formulated to be applied in a variety of ways, including by ink-jetting or by depositing with a marker (or other similar instrument). For example, if a pre-colorant is applied using ink-jet architecture, then the developer can be present in a marker or other depositing instrument. Alternatively, if a developer is applied using ink-jet architecture, then the invisible ink can be present in a marker or other depositing instrument.

As used herein, the term "visible" refers to the ability of an individual to see something with the naked eye. Thus, a visible ink can be easily seen when in solution or upon application to a substrate. A visible ink will typically emit at least one wavelength within the visible spectrum, which typically corresponds with photons of wavelengths ranging from about 400 to 700 nm. Visible inks can also emit wavelengths outside of the visible spectrum, but include at least one wavelength within the visible spectrum.

As used herein, the term "invisible" refers to the inability for an individual to readily see a printed image with the naked eye. This does not mean that the substance must be completely invisible. For example, a composition that is invisible can be substantially colorless, and can contain either a pre-colorant or a developer. Thus, the term "invisible" is more appropriately used to identify the lack of a colorant and the ability of a composition or an image to look insubstantially different from a background. When an invisible composition is in solution or on a substrate, it can be apparent to an observer that a solution is present and still be considered "invisible." An invisible composition and/or image can become visible with the addition of the appropriate chemistry.

As used herein, the term "image" refers to marks, signs, symbols, figures, indications, and/or appearances deposited upon a substrate with either a visible or an invisible composition. Examples of an image can include characters, words, numbers, alpha-numeric symbols, punctuation, text, lines, underlines, highlights, graphics and the like.

As used herein, the terms "over-strike," "over-striking," or "over-stricken" refer to processes of printing, marking, or depositing solution on top of the previously printed character or image. A device used for over-striking can be a contacting device such as a marker, or a non-contacting device, such as an inkjet printer. When an invisible image has been over-stricken with a device containing a composition of appropriate chemistry, an invisible image can become visible. Alternatively, when a visible image has been over-stricken with a device employing the appropriate chemistry, the image can become colorless or invisible.

The term "marker" includes any contact instrument or device that can be used to overstrike an ink-jet ink produced image, and is not intended to merely include a single type of marking device. In describing certain embodiments, when referring to the use of a marker, it is not to be inferred that such a device is the only type of over-striking device that can be used.

The terms "first invisible composition" and "second invisible composition" can be used to describe two separate compositions that react with one another to form a second visible composition. In one embodiment, the first invisible composition can be an invisible ink and the second invisible composition can be a developer configured to react with the invisible ink to form the second visible image. In another embodiment, the first invisible composition can be a developer and the second invisible composition can be an invisible ink configured to react with the developer to form the second visible image.

With this in mind, the present invention is drawn to systems and methods for ink-jet printing. More specifically, the invention includes the use of visible inks, invisible compositions such as invisible inks and developers, and resultant images prepared using the same. As such, an ink-jet printing system can include a substrate, visible ink-jet ink, and first and second invisible compositions. In one aspect, the visible ink-jet ink composition can be configured to be ink-jetted onto at least a portion of the substrate to form a first visible image. The first invisible composition can be configured to be ink-jetted onto at least a portion of the substrate to form an invisible image, where the invisible image can be visibly associated with the first visible image. Also, the second invisible composition can be configured for over-striking at least a portion of the invisible image, where the first and second invisible compositions can be further configured to react, and form a second visible image. In one aspect, the association of the first and second visible images on the substrate can draw attention to the first visible image.

In an alternative embodiment, a method of ink-jet printing can comprise steps of ink-jetting a visible ink-jet ink composition onto at least a portion of a substrate to form a first visible image, and ink-jetting a first invisible composition onto at least a portion of the substrate to form an invisible image, where the invisible image can be visibly associated with the first visible image. Also, an aspect of the invention can include over-striking at least a portion of the invisible image with a second invisible composition, thereby causing the first and second invisible compositions to react and form a second visible image. In another aspect, the association of the first and second images on the substrate can draw attention to the first visible image.

In another embodiment, an ink-jet printing system can include a substrate, visible ink-jet ink, and first and second invisible compositions. In one aspect, the visible ink-jet ink composition can be configured to be ink-jetted onto at least a portion of the substrate to form a first visible image. In one aspect, the first visible image is a character. Also, the first invisible composition can be configured to be ink-jetted onto at least a portion of the substrate to form an invisible image, wherein the invisible image can be visibly associated with the first visible image. In addition, the second invisible composition can be configured for over-striking at least a portion of the invisible image. In one aspect, one of the first and second invisible compositions is an invisible ink, and the other is a developer. The developer can be configured for developing the invisible ink to form a second visible image on the substrate. In another aspect, the second visible image can be selected from the group consisting of a highlight, an underline, and combinations thereof, which can thereby draw attention to the first visible image.

With respect to the compositions, systems, and methods described herein, one of the first and second invisible compositions can include an invisible ink, and the other can include a developer. In one embodiment, the first invisible composition can include the developer and the second invisible composition can include the invisible ink. In another embodiment, the first invisible composition can include the invisible ink, and the second invisible composition can include the developer. In either embodiment, the developer can be configured for developing the invisible ink to form the second visible image.

Regarding the first visible image, it can be a character, text, symbol, alpha-numeric character, number, letter, passage of text, picture, figure, diagram, schematic, formula, shape, line, chart, table, etc. Accordingly, the first visible image can be of any form resulting from ink containing a colorant that is printed on a substrate. The second visible image can be a highlight, solid underline, dotted underline, solid double underline, broken-line underline, bullet point, subscript, superscript, strikethrough, double strikethrough, shadow, outline, graphic, etc. In other words, the second visible image can be of any form arising from ink-jetting an invisible solution containing either a pre-colorant or a developer on a substrate followed by over-striking the first invisible image formed therefrom with a solution configured to form a visible image thereon.

Optionally, the present systems and methods can further include a third invisible composition, which can be formulated for ink-jet printing or over-striking the second visible image. The third invisible composition can be applied to result in the over-stricken portion of the image to become substantially colorless. Thus, at least a portion of the image can return to being invisible after being over-stricken with the third invisible composition. Further, the third invisible composition can be configured for application in an ink-jet printer, marker, or other depositing device.

The composition that is formed upon reacting invisible ink with a developer can result in a color typically used in highlighting, such as yellow, pink, light green, light blue, orange, etc. Alternatively, the composition can also exhibit fluorescence or luminescence. For example, the highlight can have a characteristic known as "day-glow," as they give the appearance of glowing during the day. Day-glow pinks, reds, oranges, yellows, greens, blues, indigos, purples, and violets provide an everyday demonstration of this effect, and such visible compositions can be used in accordance with embodiments of the present invention. These substances typically absorb photons with wavelengths in the UV to blue spectrums, and fluoresce in the visible spectrum. In addition to such highlighting embodiments, the second visible image can be in the form of a solid underline, dotted underline, solid double underline, broken-line underline, bullet point, subscript, superscript, strikethrough, double strikethrough, shadow, outline, etc.

Many materials that are not intrinsically visible or luminescent, but can become so after an activation or developing step can be used in accordance with embodiments of the present invention. In one embodiment, visible, reversible, or luminescent reversible activation materials can be changed from invisible to visible, and optionally, back to invisible. Reversible activation materials usually change visual properties through the use of redox chemistry. Accordingly, either developing or reversing activation processes can occur as a result of over-striking an image with a marker that includes the appropriate chemistry.

As mentioned, the present invention contemplates the utilization of three compositions in the unique systems and methods of the present invention. These three compositions include visible inks, invisible inks, and developers. Typically, the visible ink is applied using ink-jet architecture, and can include almost any visible ink-jet ink known in the art.

With respect to the invisible ink, inks including a pre-colorant and a liquid vehicle can be used. These inks can be applied as an invisible image, such as by ink-jet architecture prior to development; or can be applied by over-striking an invisible image formed by developer composition. In one embodiment, the pre-colorant can be p-nitrophenol. Alternatively, Formula 1 below provides other exemplary pre-colorants that can be used in accordance with embodiments of the present invention:

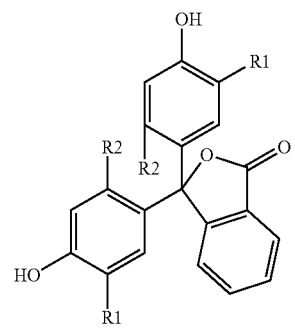

Formula 1

In Formula 1 above, R1 and R2 can be of the same moiety, or can be of different moieties, and can individually be H, C1–C4 lower alkyl, or halo such as chloro, fluoro or bromo. For example, the invisible ink composition can include the following pre-colorants: phenolphthalein (where R1 is H and R2 is H), o-cresolphthalein (where R1 is methyl and R2 is H), and/or thymolphthalein (where R1 is isopropyl and R2 is methyl).

Exemplary developers that can be used include liquid vehicle composition and at least one active component having chemistry properties compatible with causing the pre-colorants to become colored. For example, with the pre-colorants described above, appropriate active ingredients for use in a developer composition include calcium hydroxide or other alkaline earth or rare earth hydroxides or transition metal hydroxides, or triethanol amine or other alkyl amines, alkanol amines, polyamines, or combinations thereof. With respect to the pre-colorants described above, the developer can be alkaline.

In accordance with the present invention, the various compositions can be configured for ink-jet printing and/or over-striking with a marker. For example, when visible ink, invisible ink, and/or developers are formulated for ink-jet printing, certain characteristics can be considered to ensure proper function within ink-jet printers and/or ink-jet systems. Some of the physical properties that ink-jet compositions are typically configured to satisfy include limited kogation, low precipitation, good optical density, high print quality, insubstantial nozzle corrosion, appropriate viscosity, surface tensions, boiling temperatures, etc. As such, appropriate liquid vehicle formulations can be used.

Similarly, when the invisible ink and/or developers are formulated for application with a contacting device, such as a marker, certain characteristics can be considered for proper function. For example, when a solvent is applied over an image, the image can have a tendency to be solubilized, which tends to allow the colorant or pre-colorant to transfer from the substrate into solution. Such a phenomena usually appears as smear, bleed, and/or feathering. In order to prevent bleed and feathering as well as enhance waterfastness and general image quality, ink-jet ink printing systems that include a marker or other contact instrument for over-striking can be configured to minimize resolubilizing the visible or invisible compositions. As such, an over-striking composition can be formulated to limit and minimize the amount of smear, bleed, and/or feathering that arises from over-striking an image with a solution comprising a solvent. In one embodiment, the over-striking composition should not resolubilize the first ink or be highly penetrating to the media. To minimize the resolubilization, the fluid can contain only low amounts of strong polar organic solvents and avoid the use of surfactants or emulsifiers. The pH can be basic when utilizing the pre-colorants described above.

The liquid vehicles and components described herein can be applicable with respect to ink-jet ink and marker over-striking compositions. It is understood that these components are merely exemplary and do not limit the scope of vehicle components that can be used. In some embodiments of the present invention, it may be favorable for the liquid vehicle to comprise water, co-solvents, and other additives as part of the liquid vehicle. Such other additives can include buffers, biocides, sequestering agents, viscosity modifiers, anti-oxidants, flame retardants, evaporation accelerators, etc.

As described, cosolvents can be included in the ink-jet and/or marker compositions of the present invention. Suitable cosolvents for use in the present invention include water soluble organic cosolvents, but are not limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, cosolvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides. Specific examples of cosolvents that can be used include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. Cosolvents can be added to reduce the rate of evaporation of water in the ink-jet fluid to minimize clogging or other properties of the ink such as viscosity, pH, surface tension, optical density, and print quality. The ink-jet composition cosolvent concentration can range from about 10 wt % to about 60 wt %. The over-striking marker composition cosolvent concentration can range from 1 wt % to about 35 wt %.

The liquid vehicle can also comprise solution characteristic modifiers such as viscosity modifiers, pH adjustors, preservatives, various types of surfactants, antioxidants, flame retardants, evaporation accelerators, etc. Examples of surfactants that can be used include primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salt type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyidimethylbetaine, and lauryldihydroxyethylbetaine; and combinations thereof.

Acidic or alkaline substances can be included for adjusting the pH of the various compositions of the present invention. pH adjustors that can be used comprise base agents such as sodium hydroxide, lithium hydroxide, calcium hydroxide, sodium carbonate, ammonium carbonate, ammonia sodium acetate, ammonium acetate, morpholine, monoethanolamine, diethanolamine, triethanolamine, ethylmonoethanolamine, n-butyldiethanolamine, di-n-butylethanolamine, monoisopropanolamine, diisopropanolamine, and triisopropanolamine. Additionally, pH adjustors can also comprise acidic agents that can be selected from the group consisting of succinic acid, glycolic acid, citric acid, nitric acid, hydrochloric acid, phosphoric acid, sulfuric acid, polyacrylic acid, acetic acid, malonic acid, maleic acid, ascorbic acid, glutaric acid, fumaric acid, tartaric acid, lactic acid, nitrous acid, boric acid, carbonic acid, carboxylic acids such as formic acid, chloroacetic acid, dichloroacetic acid, trichloroacetic acid, fluoroacetic acid, trimethylacetic acid, methoxyacetic acid, mercaptoacetic acid, propionic acid, butyric acid, valeric acid, caproic acid, caprylic acid, capric acid, lauric acid, myristic acid, palmitic acid, stearic acid, oleic acid, rinolic acid, rinoleic acid, cyclohexanecarboxylic acid, phenylacetic acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, oxalic acid, adipic acid, phthalic acid, isophthalic acid, terephthalic acid, salicylic acid, p-hydrobenzoic acid, anthranilic acid, m-aminobenzoic acid, p-aminobenzoic acid, benzenesulfonic acid, methylbenzenesulfonic acid, ethylbenzenesulfonic acid, dodecylbenzenesulfonic acid, 5-sulfosalicylic acid, 1-sulfonaphthalene, hexanesulfonic acid, octanesulfonic acid, dodecanesulfonic acid, amino acids such as glycine, alanine, valine, α-aminobutyric acid, α-aminobutryic acid, α-alanine, taurine, serine, α-amino-n-caproic acid, leucine, norleucine, phenylalanine, and combinations thereof. If used, the ink-jet composition pH adjuster concentration can range from about 0.1 wt % to about 1 wt %. If used, the over-striking marker composition pH adjustor concentration can range from 0.1 wt % to about 2 wt %.

Consistent with the formulations of this invention, various other additives can be used to optimize the properties of the ink composition for specific applications. Examples of these additives are those added to inhibit the growth of harmful microorganisms. These additives may be biocides, fungicides, and other microbial agents, which are routinely used in liquid vehicle formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof. Sequestering agents, such as EDTA (ethylenediaminetetraaceticacid) and the like, may be included to eliminate the deleterious effects of heavy metal impurities.

In an additional aspect of the present invention, binders can be included which act to secure the images on the substrate. Binders suitable for use in the present invention typically have a molecular weight of from about 4,000 Mw to about 18,000 Mw. Non-limiting examples include polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof.

To prevent premature oxidation of pre-colorants or other components contained within the various compositions of the present invention, antioxidants can be included. Accordingly, the antioxidants can partially or completely inhibit the premature development of pre-colorants, which can allow for an invisible composition or image to remain colorless until over-stricken with a marker employing the appropriate chemistry. Examples of antioxidants, without limitation, include vitamin E, butylated hydroxytoluene, butylated hydroxyanisole, tert-butylhydroquinone, etc.

Flame retardants may be desirable to be included in the present invention to inhibit combustion of the various components. Prevention of the ignition of materials such as plastics or compositions employing solvents can be beneficial for providing safety while using the invention. Accordingly, suitable halogen containing flame retardants can include tris-nonylphonyl phosphate (e.g., Doverphos 4®, Dover Chemical Corp.), liquid brominated, chlorinated olefin (e.g., Doverguard 8426, Dover Chemical Corp.), etc.

Conventional ink-jet printers typically utilize various reservoirs of ink that are fired through orifices present on one or more plates. Since the present invention can be adapted for use with such ink-jet printers, ink-jettable invisible compositions can be contained in one or more of these reservoirs. For example, the invisible composition could replace black (K), cyan (C), magenta (M), or Yellow (Y) in a standard KCMY printer assembly. Alternatively, a full color printer can be adapted to include an additional reservoir(s) containing invisible composition, i.e., ink-jettable invisible ink or developer. In this embodiment, invisible composition can be jetted with visible ink, without sacrificing the use of a particular color.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention.

Example 1

Preparation of Compositions Including Developable Invisible Dyes

Three invisible inks were prepared using three different substituted phthalein pre-colorants, respectively. The three pre-colorants used were phenolphthalein, o-cresolphthalein, and thymolphthalein. Each of the invisible ink compositions containing its respective pre-colorant was formulated in accordance with Table 1 below to form three separate invisible ink compositions:

TABLE 1

Invisible ink composition

| Ingredient | Wt % |
| --- | --- |
| pre-colorant | 0.25 |
| diethylene glycol | 50 |
| succinic acid | 0.25 |
| Water | Balance |

Example 2

Preparation of Developer Composition

An invisible developer composition was prepared for use with the inks of Example 1. The developer composition was formulated in accordance with Table 2 below:

TABLE 2

Developer composition

| Ingredient | Wt % |
| --- | --- |
| triethanol amine | 0.5 |
| diethylene glycol | 10 |
| calcium hydroxide | 0.5 |
| isopropanol | 9 |
| water | balance |

Example 3

Ink-Jet Printing of Invisible Ink and Activating With Developer-Containing Marker The invisible inks of Example 1 were loaded into ink-jet print heads (HP type 12 print cartridges) and ink-jetted onto HP multipurpose office paper using an HP business ink-jet 3000 printer. The printed invisible images were each developed using a highlighting marker that contained a clear developer fluid formulated in accordance with Example 2. This development process resulted in the formation of three different colors, respectively. Specifically, upon development using the marker, the phenolphthalein-containing ink resulted in a pink colored image, the o-cresolphthalein-containing ink resulted in a red colored image, and the thymolphthalein-containing ink resulted in a blue colored image. Portions of each pre-color that were not over-stricken with the developer remained substantially invisible or colorless.

Example 4

Ink-Jet Printing of Developer and Activating With Invisible Ink-Containing Marker The developer of Example 2 was loaded into an ink-jet print head (HP type 12 print cartridge) and ink-jetted onto HP multipurpose office paper using an HP business ink-jet 3000 printer. The printed invisible image was developed using three different highlighting markers that each contained a different invisible ink as described in Example 1. Over-striking the developer with the invisible ink resulted in the formation of three different colors, respectively. Specifically, upon development, the use of the phenolphthalein-containing marker resulted in a pink colored image, the use of the o-Cresolphthalein-containing marker resulted in a red colored image, and the use of the thymolphthalein-containing marker resulted in a blue colored image. Portions of each invisible image that were not over-stricken with the invisible ink remained substantially invisible or colorless.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. An ink-jet printing system, comprising:
   (a) a substrate;
   (b) a visible ink-jet ink composition configured to be ink-jetted onto at least a portion of the substrate to form a first visible image on the substrate;
   (c) a first invisible composition configured to be ink-jetted onto at least a portion of the substrate to form an invisible image on the substrate, said invisible image being associated with the first visible image; and
   (d) a second invisible composition configured for over-striking at least a portion of the invisible image, wherein the first and second invisible compositions are further configured to react and form a second visible image on the substrate, said second visible image modifying the first visible image.

2. The system of claim 1, wherein one of the first and second invisible compositions is an invisible ink, and the other is a developer, said developer being configured for developing the invisible ink to form the second visible image.

3. The system of claim 2, wherein the first invisible composition comprises the developer, and the second invisible composition comprises the invisible ink.

4. The system of claim 2, wherein the first invisible composition comprises the invisible ink, and the second invisible composition comprises the developer.

5. The system of claim 2, wherein the first visible image is a character, and the second visible image is selected from the group consisting of a highlight, an underline, and combinations thereof.

6. The system of claim 2, further comprising a third invisible composition configured for over-striking at least a portion of the second visible image, wherein the third composition and the over-stricken portion of the second visible image are further configured to react and become colorless.

7. The system of claim 2, wherein the second visible image is a color within the visible spectrum.

8. The system of claim 2, wherein the second visible image is fluorescent.

9. The system of claim 2, wherein the invisible ink comprises a developable colorant selected from the group consisting of phenolphthalein, o-cresolphthalein, thymolphthalein, p-nitrophenol, and combinations thereof.

10. The system of claim 9, wherein the developer includes an active ingredient selected from the group consisting of alkaline earth hydroxides, rare earth hydroxides, transition metal hydroxides, alkyl amines, alkanol amines, polyamines, and combinations thereof.

11. A method of ink-jet printing, comprising:
   (a) ink-jetting a visible ink-jet ink composition onto at least a portion of a substrate to form a first visible image on the substrate;
   (b) ink-jetting a first invisible composition onto at least a portion of the substrate to form an invisible image on the substrate, said invisible image being associated with the first visible image; and
   (c) over-striking at least a portion of the invisible image with a second invisible composition causing the first and second invisible compositions to react and form a second visible image on the substrate, said second visible image modifying the first visible image.

12. The method of claim 11, wherein one of the first and second invisible compositions is an invisible ink, and the other is a developer, wherein upon over-striking, said developer develops the invisible ink to form the second visible image.

13. The method of claim 12, wherein the first invisible composition comprises the developer, and the second invisible composition comprises the invisible ink.

14. The method of claim 12, wherein the first invisible composition comprises the invisible ink, and the second invisible composition comprises the developer.

15. The method of claim 12, wherein the first visible image is a character, and the second visible image is selected from the group consisting of a highlight, an underline, and combinations thereof.

16. The method of claim 12, further comprising the step of over-striking at least a portion of the second visible image with a third invisible composition, wherein the over-stricken portion of the second visible image becomes colorless.

17. The method of claim 12, wherein the second visible image is a color within the visible spectrum.

18. The method of claim 12, wherein the second visible image is fluorescent.

19. The method of claim 12, wherein the invisible ink comprises a developable colorant selected from the group consisting of phenolphthalein, o-cresolphthalein, thymolphthalein, p-nitrophenol, and combinations thereof.

20. The method of claim 19, wherein the developer includes an active ingredient selected from the group consisting of alkaline earth hydroxides, rare earth hydroxides, transition metal hydroxides, alkyl amines, alkanol amines, polyamines, and combinations thereof.

21. An ink-jet printing system, comprising:
(a) a substrate;
(b) a visible ink-jet ink composition configured to be ink-jetted onto at least a portion of the substrate to form a first visible image on the substrate, wherein the first visible image is a character;
(c) a first invisible composition configured to be ink-jetted onto at least a portion of the substrate to form an invisible image on the substrate, said invisible image being associated with the first visible image; and
(d) a second invisible composition configured for over-striking at least a portion of the invisible image, wherein one of the first and second invisible compositions is an invisible ink, and the other is a developer, said developer being configured for developing the invisible ink to form a second visible image on the substrate, wherein the second visible image is selected from the group consisting of a highlight, an underline, and combinations thereof, and said second visible image modifying the first visible image.

22. The system of claim 21, further comprising a third invisible composition configured for over-striking at least a portion of the second visible image, wherein the third composition and the over-stricken portion of the second visible image are further configured to react and become colorless.

* * * * *